United States Patent [19]

Ellis et al.

[11] 3,761,895

[45] Sept. 25, 1973

[54] METHOD AND APPARATUS FOR STORING AND READING OUT CHARGE IN AN INSULATING LAYER

[75] Inventors: George W. Ellis, Burnt Hills; George E. Possin; Ronald H. Wilson, both of Schenectady, all of N.Y.

[73] Assignee: General Electric Company, Schenectady, N.Y.

[22] Filed: Mar. 17, 1971

[21] Appl. No.: 125,133

[52] U.S. Cl. 340/173 CR, 313/65 AB, 317/235 NA, 340/173 LS

[51] Int. Cl. ... G11c 5/02, G11c 11/34, G11c 13/04

[58] Field of Search ................ 340/173 CR, 173 LS; 313/65 A, 65 AB, 89, 65 T; 317/235 NA

[56] References Cited

UNITED STATES PATENTS

| | | | |
|---|---|---|---|
| 3,701,979 | 10/1972 | Smith | 340/173 R |
| 3,668,473 | 6/1972 | Miyashiro | 317/235 NA |
| 3,458,782 | 7/1969 | Buck | 313/65 AB |
| 3,576,392 | 4/1971 | Hofstein | 313/65 AB |
| 3,599,181 | 8/1971 | Dearnaly | 340/173 CR |

OTHER PUBLICATIONS

Varker & Juleff, Electron Beam Recording in $SiO_2$ with Direct Read–Out Using the Electron Beam Induced Current at a P–N Junction, Proc. of IEEE, Letters, May, 1967, pp. 728, 729.

*Primary Examiner*—Bernard Konick
*Assistant Examiner*— :uart Hecker
*Attorney*—Richard R. Brainard, Paul A. Frank, Charles T. Watts, Paul F. Wille, Frank L. Neuhauser, Oscar B. Waddel and Joseph B. Forman

[57] ABSTRACT

An electron beam addressable memory is disclosed in which information is stored as an electric charge in a multilayered memory target. The multilayered memory comprises a conductive layer, an insulating layer having a plurality of charge storage sites, a layer of n- type and a layer of p-type semiconductor material having a p-n junction therebetween. The method of writing causes charge to be stored at selected sites in the insulating layer. The method of reading causes the current through the p-n junction, which is reverse biased, to vary in magnitude depending upon whether or not the beam impinges on a charged site. The read and write electron beams are preferably of the same energy and a different voltage is applied to the conductive layer during reading than is applied during writing. In another embodiment, the conducting layer is omitted and the effect of different voltages applied to the conducting layer is produced by secondary emission from the insulating layer.

20 Claims, 4 Drawing Figures

Inventors:
George W. Ellis,
George E. Possin,
Ronald H. Wilson,
by Paul F. Wille
Their Attorney.

METHOD AND APPARATUS FOR STORING AND READING OUT CHARGE IN AN INSULATING LAYER

This invention relates to memory devices and, in particular, to charge storage memories in which information is addressed, stored, read out and erased by action of an electron beam.

In the information art, one of the key elements in any information handling or processing system is the memory in which the information is stored. The present state of development of this art places several requirements on the memory. One of these is high storage capacity. Another is high storage density. A third is high information transfer rate. A fourth is low cost per bit of information.

The various approaches taken in the past in the design of memories can broadly be divided into two categories: electrostatic and magnetic. In the electrostatic category, some memories utilize an electron beam, some utilize a grid pattern of conductors, some rely on charge storage, some rely on deformation or destruction of the memory medium. Examples of these types of memories include writing with an electron beam on photoplastic film and "developing" the film to permanently store the information. Another approach has been to store charge in the gate structure of a MOS transistor, a plurality of such transistors making up the memory. A third approach has been the use of a circulating charge memory in which charge is circulated about a semiconductor structure under the influence of potentials applied to electrodes overlying the charge storage medium.

With the photoplastic film system, while storage time is theoretically infinitely long, the stored information is not readily changed.

Semiconductive charage storage memories have tended to have rather short storage times, on the order of milliseconds, thereby requiring that the information be periodically "refreshed". Further, semiconductor memories to date are of the "structured" variety, i.e. overlying the semiconductive material is a matrix or pattern of electrodes that define the storage area and storage sites.

In general, an electrostatic memory having a large capacity, low cost per bit, rapid access, and long storage time yet readily erasable, has not been provided.

In view of the forgoing, it is therefore an object of the present invention to provide a method for reading and writing information as electric charages in a memory.

Another object of the present invention is to provide a readily erasable electrostatic memory having a long, i.e. greater than 100 hours, storage time.

A further object of the present invention is to provide a storage medium that is selectively erasable.

Another object of the present invention is to provide a high density storage medium for use with electron beam reading and writing apparatus.

Another object of the present invention is to provide a structureless semiconductor memory.

A further object of the present invention is to provide a charage storage, semiconductor memory wherein the charage is stored in an insulating layer overlying the semiconductor.

A further object of the present invention is to provide a charage storage, semiconductor memory utilizing a reverse biased p-n junction for readout.

The foregoing objects are achieved in the present invention wherein there is provided a p-type semiconductor having an n-type semiconductor layer deposited thereon to form a p-n junction therebetween. The p-n junction may be fabricated by any suitable technique, such as by diffusing the p- into the n-layer or by epitaxially growing the n-on the p-layer. Overlying the p-n junction is an insulating layer in which charge is stored. Overlying the insulating layer is a conducting layer used to bias the insulating layer.

To write on the insulator, the conducting layer is biased positively with respect to the n-type layer. A storage site is irradiated with an electron beam of sufficient energy to pass through, but not destroy, the insulating layer. To read, the conducting layer bias is made negative and the site is irradiated with an electron beam with energy sufficient to penetrate into the n-layer, the same energy as for writing. The information is read as the presence or absence of current in the p-n junction. In the preferred embodiment, readout is destructive, i.e. reading also erases the memory. If desired, readout may be made to cause only partial erasure by modifying the operating parameters of the memory, e.g. reducing the beam current and/or the length of time the beam irradiates a storage site.

An alternative embodiment uses secondary electron emission from the insulator surface to provide bias without the use of a conducting overlay. In the latter case, the writing beam energy is less than the second crossover energy for secondary emission from the insulator surface and the reading beam energy is greater than the second crossover energy. At the second crossover energy, the ratio of secondary emission current to beam current is unity. Below the second crossover energy, the ratio is greater than one; above the second crossover energy, the ratio is less than one. When bombarded with an electron beam below the second crossover energy, the insulator charges positively; above the second crossover energy, the insulator charges negatively.

A more complete understanding of the present invention may be obtained by considering the following detailed description is conjunction with the accompanying drawings in which.

Figure 1:
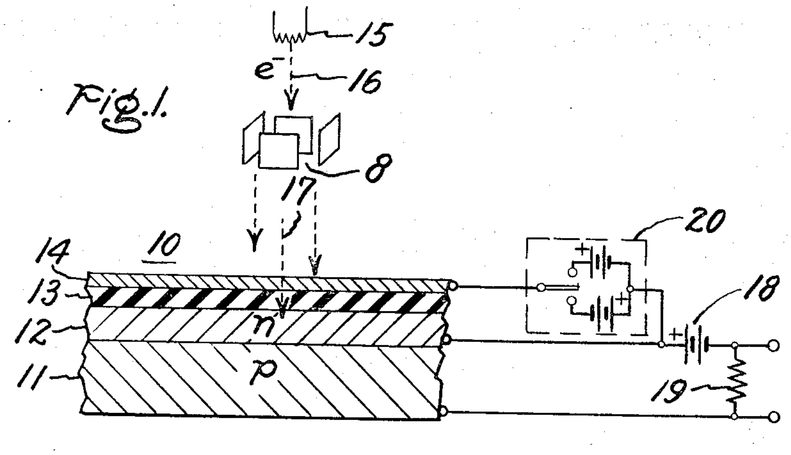
FIG. 1 illustrates one embodiment of the present invention.

Referring to FIG. 1, memory 10 is illustrated as comprising a layer 11 of p-type semiconductor material having an overlying layer 12 of n-type semiconductive material, thereby forming a p-n junction. Overlying n-type layer 12 is insulating layer 13 which serves to store charge as will be more fully described hereafter. Preferably, layers 11 and 12 are of p and n-type silicon, respectively, and insulating layer 13 is silicon dioxide. Overlying the insulator is conducting film 14 which serves to provide an electrode for applying a potential across the insulator. Electrons used to read and write on the memory are obtained from source 15 which produces a stream of electrons 16. The stream of electrons 16 is deflected, in random access or in a pattern, to the different storage sites on memory 10 by deflector 8.

While an electrostatic deflector is shown, any suitable deflector may be utilized; for example, the matrix deflection system disclosed and claimed by S. P. Newberry in U.S. Pat. No. 3,534,219. This deflection system comprises a coarse deflector, illustrated as two pairs of orthogonal electrostatic plates, and a fine deflector composed of a matrix of lenslets for precisely directing the electron beam over adjacent areas of a target. Selection of the lenslet and storage site to be either written on or read out is made by an address command module controlling the amplifiers coupled to the deflectors.

As illustrated in FIG. 1, the stream of electrons such as shown by arrow 17 penetrates through insulating layer 13 to n-type semiconductor layer 12. Connected between n-layer 12 and p-layer 11 is a source of reverse bias 18 and a current to voltage converting means, illustrated as series resistor 19. Series resistor 19 provides a variable voltage output obtained during the reading of the information from memory 10. Connected between conducting layer 14 and n layer 13 is a source of bias 20 which can be connected to bias conducting layer 14 either positively or negatively; for writing or reading, respectively. While illustrated as a pair of oppositely poled batteries and a selection switch, obviously other suitable sources of bias may be used, for example, a source of pulses may be coupled to layer 14 to provide the read and write biases.

Figure 2:
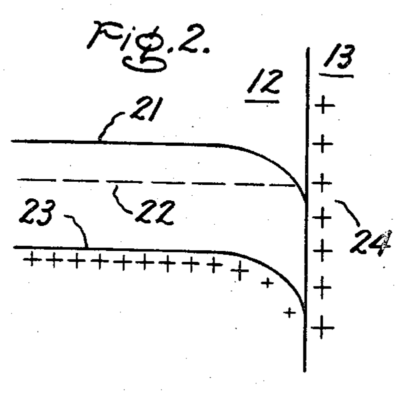
FIG. 2 is an energy level diagram useful in explaining the effect of stored charge.
Figure 3:
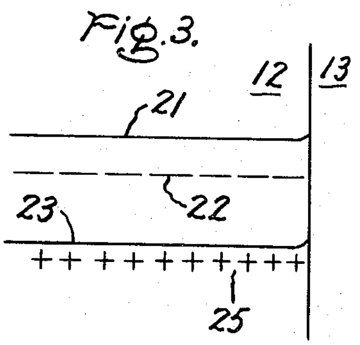
FIG. 3 is an energy level diagram useful in explaining the operation in the absence of stored charge.

The overall operation of memory 10 may best be understood by also considering the energy diagrams illustrated in FIGS. 2 and 3. The energy level diagram represents the energy levels at the semiconductor-insulator interface. The n-type semiconductor layer has conduction band edge 21, Fermi level 22 and valence band edge 23. During the writing operation, conductive layer 14 is positively biased and electrons from source 15 penetrate an area of insulating layer 13 and produce a net positive charage therein. This occurs by virtue of the fact that high energy electrons penetrating insulating layer 13 induce conduction within insulating layer 13. The electrons thus produced are removed in bias source 20 when conducting layer 14 is positively biased, leaving a net positive charge 24 in insulating layer 13 near n-layer 12. When insulating layer 13 is so charged, the conduction and valence band edges, 21 and 23 respectively, bend, as indicated in FIG. 2.

If the electron beam is not directed to a storage site in insulating layer 13, there is little or no positive charge stored as shown in FIG. 3. In that case bands 21 and 23 are not bent down and holes in n-layer 12 can readily recombine with electrons in n-layer 12 as discussed below.

During readout of a storage site, electrons 17, from source 15, penetrate through insulating layer 13 to n-type semiconductor layer 12, inducing a multitude of electron-hole pairs therein near insulating layer 13. By virtue of the positive charge on insulating layer 13, the holes are repelled by insulating layer 13 and drift toward p-type semiconductor layer 11. This flow of holes is read out over series resistor 19 as an increase in the reverse bias current through the p-n junction.

If no charge is stored in insulating layer 13, the holes created in n-layer 12 diffuse to the interface between insulating layer 13 and n-layer 12 where they readily recombine with electrons from the n-layer and do not contribute to current in the p-n junction.

Readout, as noted previously, can be either destructive or partially destructive. The electron beam induces conduction in the insulating layer. If the metal layer is biased negatively with respect to n-layer 12 during this time, the conduction electrons in the insulator neutralize the stored positive charge and thereby restore the insulator to its unwritten condition, i.e. the information is erased. Thus, the area read out is placed in an unwritten condition by action of the electron beam during reading. For partial erasure, the beam current or the irradiation time can be reduced.

As illustrated in FIG. 2, when positive charge 24 is stored within insulator 13, the conduction and valence energy levels within n-type semiconductor layer 12 are bent at the insulator-semicondctor interface. This change in the conduction and valence energy levels prevents holes 25 of the electron-hole pairs induced in n-type semiconductor layer 12 from reaching the interface between n-type semiconductor 12 and insulating layer 13 by increasing the energy required to reach the interface.

As illustrated in FIG. 3, holes 25 are able to reach the interface where they can recombine with electrons since no greater energy is required to reach the interface.

In summary, the memory operates the effect of storged charge on the operation of the p-n junction when the insulator and n layers are irradiated with an electron beam. The stored charge itself is not read out, thereby enabling one to obtain a relatively large output signal. As noted above, however, the stored charge may be partially or wholly dissipated during readout. In addition, reading and writing are separate, independent operations, i.e. one cannot read and write simultaneously since they involve different operating conditions. Further, since the electron beam induces a multitude of electron-hole pairs in n-layer 12, the memory exhibits high gain when positive charge is stored in insulator 13. If no charge is stored, the memory exhibits very little gain even though the number of induced electron-hole pairs is approximately the same. Thus the presence or absence of charge in insulator 13 affects the probability of hole collection at the p-n junction: with positive charge stored, the probability is much higher than with no charge stored.

As an example of a memory in accordance with the present invention, the following table represents suitable materials, thickness ranges and specific values for a memory utilizing either epitaxially grown or sputtered layers:

TABLE I

| Element | Material | Range | Specific Example |
|---|---|---|---|
| conducting layer | Al | 0.01–0.5 μ | 0.08 μ |
| insulating layer | $SiO_2$ | 0.01–2.0 μ | 0.6 μ |
| semiconductive layer | n-type Si | 2–50 μ | 10 μ |
| semiconductive layer | p-type Si | 50–500 μ | 100 μ |

For diffused semiconductive layers, the following table exemplifies the construction of a memory in accordance with the present invention:

TABLE II

| Element | Material | Range | Specific Example |
|---|---|---|---|
| conducting layer | Al | 0.01–0.5 μ | 0.08 μ |
| insulating layer | $SiO_2$ | 0.01–2.0 μ | 0.6 μ |
| semiconductive | | | |

| | | | |
|---|---|---|---|
| layer semiconductive | n-type Si | 20–200 μ | 50 μ |
| layer | p-type Si | 1–5 μ | 2 μ |

Other materials having suitable semiconductive, insulating, or conducting properties can be used, such as, but not exclusively, germanium, silicon nitride or gold, respectively. For memories constructed in accordance with either Table I or II, typically a 10 kilovolt beam can be utilized with a 5 volt reverse bias on the p-n junction. The bias on the conducting layer can be + or − 10 volts for writing or reading/erasing, respectively. With a typical beam current of 0.5 μA, a charge density of $10^{-7}$ coulombs per square centimeter is produced in an area approximately 4 microns in diameter. The charge density can vary from $10^{-9}$ up to about $10^{-3}$ C/cm². As the upper limit for charge density is approached, however, the reading and writing operations tend to slow down. Any suitable deflection system can be used: electrostatic, magnetic or the matrix deflection system of the previously noted patent to S. P. Newberry, Pat. No. 3,491,236. The latter system enables especially small storage sites to be obtained.

The memory in accordance with the present invention is structureless, i.e. the storage sites are not physically defined in the insulator. The term "structure-less" does not necessarily mean a flat sheet 1 or 1 ½ inches square with $10^6$ or more storage sites. A structureless memory in accordance with the present invention may, for example, comprise several smaller area memory cells capable of storing, for example, only $10^4$ bits of information. Then several of these cells can be coupled together to achieve the desired storage capacity.

There are several reasons why one may desire not to make the full memory out of a single cell. For example, it may be easier to produce a perfect p-n junction of smaller area than to produce one large one, the equivalent of several smaller ones. Further, some large single p-n junctions may have a rather high capacitance as well as a relatively high reverse current. In order to reduce these undesirable effects, several smaller area p-n junctions can be used. Thus, the term structureless is merely used to refer to a device that does not utilize electrodes on a one-to-one basis with the storage sites but rather contains within one area of insulator surface a relatively larger number of storage sites than has heretofore been provided in the prior art.

Figure 4:
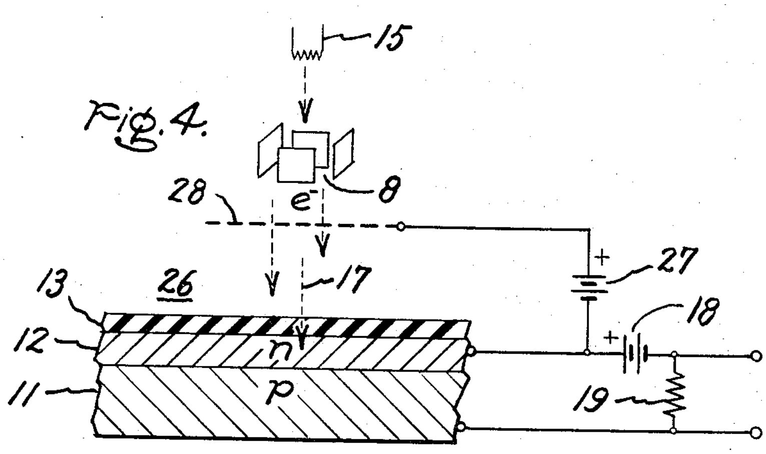
FIG. 4 is an illustration of an alternative embodiment of the present invention.

FIG. 4 illustrates an alternative embodiment of the present invention which utilizes an electron beam of one energy to write and of a second, higher, energy to read. That is, the control voltage on insulating layer 13 is obtained by secondary electron emission from the insulator surface rather than by a conducting layer as in the embodiment illustrated in FIG. 1.

Specifically, memory 26 comprises p-type layer 11 overlying n-type layer 12 and insulating layer 13. Source 27 biases collector electrode 28 positively with respect to n-layer 12 so that secondary electrons from the surface of insulating layer 13 are collected by electrode 28.

During the writing operation of the memory, the energy of the electrons from source 15 is adjusted to less than the second crossover energy for secondary emission from layer 13 so that the surface of layer 13 is biased positively. The storage of charge is the same as when a conducting layer is biased positively in the previous embodiment.

For reading and erasing, the energy of the electrons from source 15 is made greater than the second crossover energy of layer 13. The surface of layer 13 is then negatively biased and the reading or erasing proceeds as indicated in the previous embodiment.

The examples of materials and thickness ranges given above in Tables I and II also apply to the embodiment illustrated in FIG. 4, except that no conductive layer is used. Without a conductive layer, the beam energy is varied above and below the second crossover energy for secondary emission in the insulator. To continue the example given previously: for silicon dioxide, this level is about 2.8 kilovolts. Thus, a 2 kv. write beam and a 7 kv. read beam can be used with a 5 volt reverse bias on the p-n junction. Grid 28 has a small positive potential, e.g. + 20 volts.

Thus, there is provided by the present invention an improved memory element in which information is stored as a plurality of discrete charges located over a memory surface that does not by its structure define the storage areas. The storage density threfore is limited only by the characteristics of the electron beam; that is, the beam width and the effects of dispersion within the various layers of the memory device. The device itself may be fabricated in a variety of ways, for example, a p-type substrate could have n-layer 12 formed by epitaxial growth techniques or an n-type substrate could have the p-type layer formed by diffusion. Insulating layer 13, which may advantageously be an oxide of the semiconductor, can either be deposited or grown upon the semiconductor surface.

While preferred embodiments of the present invention have been shown and described, it will be apparent to those skilled in the art that various modifications can be made within the spirit and scope of the present invention. For example, while the present invention has been described in terms of a p-type semiconductor substrate having an n-type layer thereon, memory devices in accordance with the present invention can also be made with an n-type substrate having a p-type layer thereover. Oxide layer 13 would then be applied over the p-type layer. Furthermore, while the stored charge has been considered positive, memory devices in accordance with the present invention can store negative charge.

What we claim as new and desire to secure by Letters Patent of the United States is:

1. An electron beam addressable semiconductor memory comprising:

a first layer of semiconductive material;

a second layer of semiconductive material, of different conductivity from said first layer, overlying said first layer and forming a junction therewith;

insulating means in contact with and overlying said second layer, said insulating means having a plurality of storage sites therein for storing information as a charge induced by an electron beam, said information being represented by the presence or absence of charge;

a metal layer, in contact with and overlying said insulating means;

a source of an electron beam of approximately constant energy;

means for selectively deflecting said electron beam to said plurality of storage sites;

variable biasing means coupled to said metal layer and said second layer;

said metal layer and said variable biasing means coacting with said electron beam to store and read out information from said insulating layer;

biasing means coupled to said first and second layers for reverse biasing the junction formed by said layers; and readout means coupled to said first and second layers for reading out information as variations in the reverse current through said junction.

2. The method of storing in and reading out a memory containing information in the form of a plurality of electric charges at storage sites on an insulator overlying a single p-n semiconductor device and including a conductive layer overlying said insulator comprising the steps of:

storing information as a plurality of electric charges in said insulator;

inducing a plurality of electron-hole pairs with an electron beam at selected storage sites in the underlying p-n device;

varying, with the stored charage, the hole collection probability at the junction of said p-n device;

reverse biasing said p-n device; and monitoring the reverse current through said p-n device for current variations as a function of said collection probability.

3. The method of storing and reading out information in the form of the presence or absence of discrete electric charges on an insulator overlying a single p-n semiconductor device comprising the steps of:

storing positive charge at a selected site in said insulator with a directed electron beam having an energy less than the second crossover energy for secondary emission in said insulator; and reading out the information from said site with a directed electron beam having an energy greater than said second crossover energy to induce electron-hole pairs in the n-layer of said p-n semiconductor device, repelling the holes by the stored charge away from said insulator toward the junction of said p-n device, and monitoring the reverse current through said p-n device to detect variations in the reverse current caused by collection of said repelled holes at said junction.

4. The method of storing and reading out a memory containing information in the form of a plurality of electric charges on an insulator overlying a single p-n semiconductor device and including a conducting layer overlying said insulator, comprising the steps of:

storing charge by biasing said conducting layer positively with respect to the n-layer of said p-n device, and selectively irradiating the storage sites at which it is desired to store charge;

reading out information by biasing said conducting layer negatively with respect to the n-layer of said p-n device, selectively irradiating the storage sites desired to be read with an electron beam of the same energy as used to store charge to induce a plurality of electron-hole pairs at selected sites in the underlying p-n device, varying the hole collection probability at the junction of said p-n device with the stored charge, and monitoring the reverse current through said p-n device for current variations as a function of said collection probability.

5. The method as set forth in claim 4 wherein said varying step comprises:

repelling the holes of said induced electron-hole pairs away from the storage site and generally toward the junction of said p-n device to increase the probability of collection at the junction of said p-n device.

6. An electron beam addressable semiconductor memory comprising:

a first layer of semiconductive material;

a second layer of semiconductive material, of different conductivity from said first layer, overlying said first layer and forming a junction therewith;

insulating means in contact with and overlying said second layer, said insulation means having a plurality of storage sites therein;

a source of an electron beam having first and second energy levels;

means for selectively deflecting said electron beam to said plurality of storage sites for inducing charge in said insulating layer by the electron beam at said first energy level and for inducing carriers in said second layer by the electron beam at said second energy level;

a discrete quantity of charge stored in at least one of said storage sites for controlling said induced carriers;

biasing means coupled to said first and second layers for reverse biasing the junction formed by said layers; and readout means coupled to said first and second layers for reading out information as variations in the reverse current through said junction.

7. An electron beam addressable semiconductor memory as set forth in claim 6 wherein:

said first layer comprises p-type semiconductive material;

said second layer comprises n-type semiconductive material; and said insulating means comprises an oxide of the semiconductive material.

8. An electron beam addressable semiconductor memory comprising:

a source of an electron beam having two energy levels, a first energy level for writing and a second, higher energy level for reading and erasing;

an insulating layer having a plurality of storage sites therein;

a discrete quantity of charge stored in at least one of said plurality of storage sites, the presence or absence of charage at a storage site representing the information being stored;

means for selectively deflecting said electron beam to said plurality of storage sites;

a p-n junction, having a layer of p-type material and a layer of n-type material, underlying said insulating layer;

means coupled to said p-n junction for reverse biasing the p-n junction; and means for detecting information during readout as variations in the reverse current through said p-n junction, said variations caused by the influence of said charge on carriers in one of said p-type and n-type materials.

9. An electron beam addressable semiconductor memory as set forth in claim 8 wherein said layer of p-type material is adjacent to said insulating layer; and said information is stored as a plurality of discrete positive charges within said insulating layer.

10. An electron beam addressable semiconductor memory as set forth in claim 8 wherein said charges are induced by a bias created by secondary emission from said insulator.

11. The method of storing and reading out a memory containing information in the form of the presence or absence of discrete electric charges on an insulator overlying a single p-n semiconductor device comprising the steps of:

storing positive charge at a plurality of storage sites in said insulator with a directed electron beam;

inducing a plurality of electron-hole pairs at selected sites in the underlying p-n device;

varying with the stored charge, the hole collection probability at the junction of said p-n device; and monitoring the reverse current through said p-n device for current variations as a function of said collection probability.

12. The method as set forth in claim 11 wherein said storing step comprises irradiating said insulator with an electron beam having an energy less than the second crossover energy for secondary emission in said insulator; and said inducing step comprises irradiating said insulator and said p-n device with a beam energy greater than the second crossover energy.

13. The method as set forth in claim 11 wherein said varying step comprises:

repelling the holes of said induced electron-hole pairs away from the storage site and generally toward the junction of said p-n device to increase the probability of collection at the junction of said p-n device.

14. The method as set forth in claim 11 wherein said monitoring step comprises:

back-biasing said p-n device through a series resistance;

utilizing the voltage variations across said series resistance as an indication of the stored information.

15. An electron beam addressable semiconductor memory comprising:

a source of an electron beam;

insulating means having a plurality of sites therein for storing discrete charges under the influence of said electron beam;

means for selectively deflecting said electron beam to said plurality of storage sites;

a metal layer, in contact with and overlying said insulating means;

variable biasing means coupled to said metal layer;

said metal layer and said variable biasing means coacting with said electron beam to store and read out information in the form of the presence or absence of said charges in said insulating means;

a p-n junction including a layer of p-type semiconductor material and a layer of n-type semiconductor material underlying said insulating means;

biasing means coupled to said p-n junction for reverse biasing the p-n junction; and means for detecting variations in the reverse current through said p-n junction as a function of the information stored in said sites.

16. An electron beam addressable semiconductor memory as set forth in claim 15 wherein said n-type and p-type semiconductor material comprises silicon and said insulating means comprises a layer of silicon dioxide.

17. An electron beam addressable semiconductor memory as set forth in claim 15 wherein said biasing means comprises a source of operating current and said means for detecting comprises a resistance connected in a series circuit with said source of operating current and said p-n junction, said resistance converting variations in said reverse current into voltage variations.

18. An electron beam addressable semiconductor memory as set forth in claim 15 wherein said layer of n-type material is adjacent said insulating means; and said information is stored as a plurality of discrete positive charges within said insulating means.

19. An electron beam addressable semiconductor memory as set forth in claim 18 wherein said p-type material is diffused into said n-type material.

20. An electron beam addressable semiconductor memory as set forth in claim 18 wherein said n-type material is epitaxially grown on said p-type material.

* * * * *

UNITED STATES PATENT OFFICE

CERTIFICATE OF CORRECTION

Patent No. 3,761,895 Dated September 25, 1973

Inventor(s) George W. Ellis, George E. Possin & Ronald H. Wilson

It is certified that error appears in the above-identified patent and that said Letters Patent are hereby corrected as shown below:

On the cover sheet, item [56], references cited, should also include:

UNITED STATES PATENTS

| | | | |
|---|---|---|---|
| 3,560,756 | 2/1971 | Labuda | 250/217 |
| 3,590,272 | 6/1971 | Keshaven | 307/304 |

OTHER PUBLICATIONS

McDonald & Everhart, Proc. IEEE; Vol. 56, No. 2; pgs. 158-166; Feb. 1968.

Huber et al, Applied Physics Letters; Vol. 16, No. 4; pgs. 147-149; Feb. 1970.

Luedicke & Silver, Proc. of IEEE, Letters, pgs. 1865-1866; Nov. 1970.

In column 1, lines 50, 62, 63 and 66, "charage" should be -- charges--. should read -- 12 --. In column 4, lines 26 and 27 should read -- In summary, the memory operates by the effect of stored charge... --.

Signed and sealed this 17th day of September 1974.

(SEAL)
Attest:

McCOY M. GIBSON JR.
Attesting Officer

C. MARSHALL DANN
Commissioner of Patents